United States Patent
Tuting et al.

(10) Patent No.: US 11,777,989 B1
(45) Date of Patent: Oct. 3, 2023

(54) AUTOMATED DEPLOYMENT OF DECOY PRODUCTION NETWORKS

(71) Applicant: RAYMOND JAMES FINANCIAL, INC., Saint Petersburg, FL (US)

(72) Inventors: Al-Nath Tuting, Oldsmar, FL (US); Anthony Latteri, Odessa, FL (US); Benjamin Michael Weber, Land O Lakes, FL (US); Michael Dylan McKinley, Tampa, FL (US)

(73) Assignee: Raymond James Financial, Inc., St. Petersburg, FL (US)

( * ) Notice: Subject to any disclaimer, the term of this patent is extended or adjusted under 35 U.S.C. 154(b) by 0 days.

(21) Appl. No.: 18/310,337

(22) Filed: May 1, 2023

(51) Int. Cl.
 *H04L 9/40* (2022.01)
(52) U.S. Cl.
 CPC ...... *H04L 63/1491* (2013.01); *H04L 63/1416* (2013.01); *H04L 63/1425* (2013.01)
(58) Field of Classification Search
 CPC ............. H04L 63/1491; H04L 63/1416; H04L 63/1425
 See application file for complete search history.

(56) References Cited

U.S. PATENT DOCUMENTS

| | | | | |
|---|---|---|---|---|
| 2002/0147915 | A1* | 10/2002 | Chefalas | G06F 21/56 713/188 |
| 2017/0289191 | A1* | 10/2017 | Thioux | H04L 63/1441 |
| 2020/0252429 | A1* | 8/2020 | Vissamsetty | H04L 61/4523 |
| 2021/0058395 | A1* | 2/2021 | Jakobsson | H04L 67/306 |
| 2021/0288960 | A1* | 9/2021 | Nickolai | H04L 63/0884 |
| 2023/0156037 | A1* | 5/2023 | Soni | H04L 63/0263 726/23 |
| 2023/0164184 | A1* | 5/2023 | Kothari | H04L 63/1416 726/23 |

FOREIGN PATENT DOCUMENTS

| | | | | |
|---|---|---|---|---|
| GB | 2544309 A | * | 5/2017 | ......... H04L 63/1416 |
| WO | WO-2009032379 A1 | * | 3/2009 | ............. G06F 21/55 |
| WO | WO-2023081098 A1 | * | 5/2023 | ......... G06F 16/9024 |

* cited by examiner

*Primary Examiner* — Sarah Su
(74) *Attorney, Agent, or Firm* — EVERSHEDS SUTHERLAND (US) LLP

(57) ABSTRACT

Systems, methods, and computer-readable media are disclosed for systems and methods for automated deployment of decoy production networks. Example methods may include detecting, by one or more computer processors coupled to memory, an unauthorized user in a production network environment, determining a computer-executable payload associated with the unauthorized user, and initiating a first virtual decoy production network environment. Methods may include causing the computer-executable payload to be executed in the first virtual decoy production network environment, and recording telemetry data associated with execution of the computer-executable payload in the first virtual decoy production network environment.

20 Claims, 7 Drawing Sheets

US 11,777,989 B1

AUTOMATED DEPLOYMENT OF DECOY PRODUCTION NETWORKS

BACKGROUND

Protected network environments may be subject to continuous attacks and attempts for unauthorized access by unauthorized users. For example, unauthorized users may attempt to gain access to a protected network environment via theft of credentials of an authorized user, by exploiting network vulnerabilities, and so forth. Detection of such unauthorized users may be a continuous and ongoing process, where unauthorized users can be detected using manual or automated tools and processes. However, upon detection, such unauthorized users are removed from the network. Such removal prevents the possibility of additional information that can be determined based on observation of unauthorized user actions executed in the network environment. Accordingly, automated deployment of decoy production networks may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
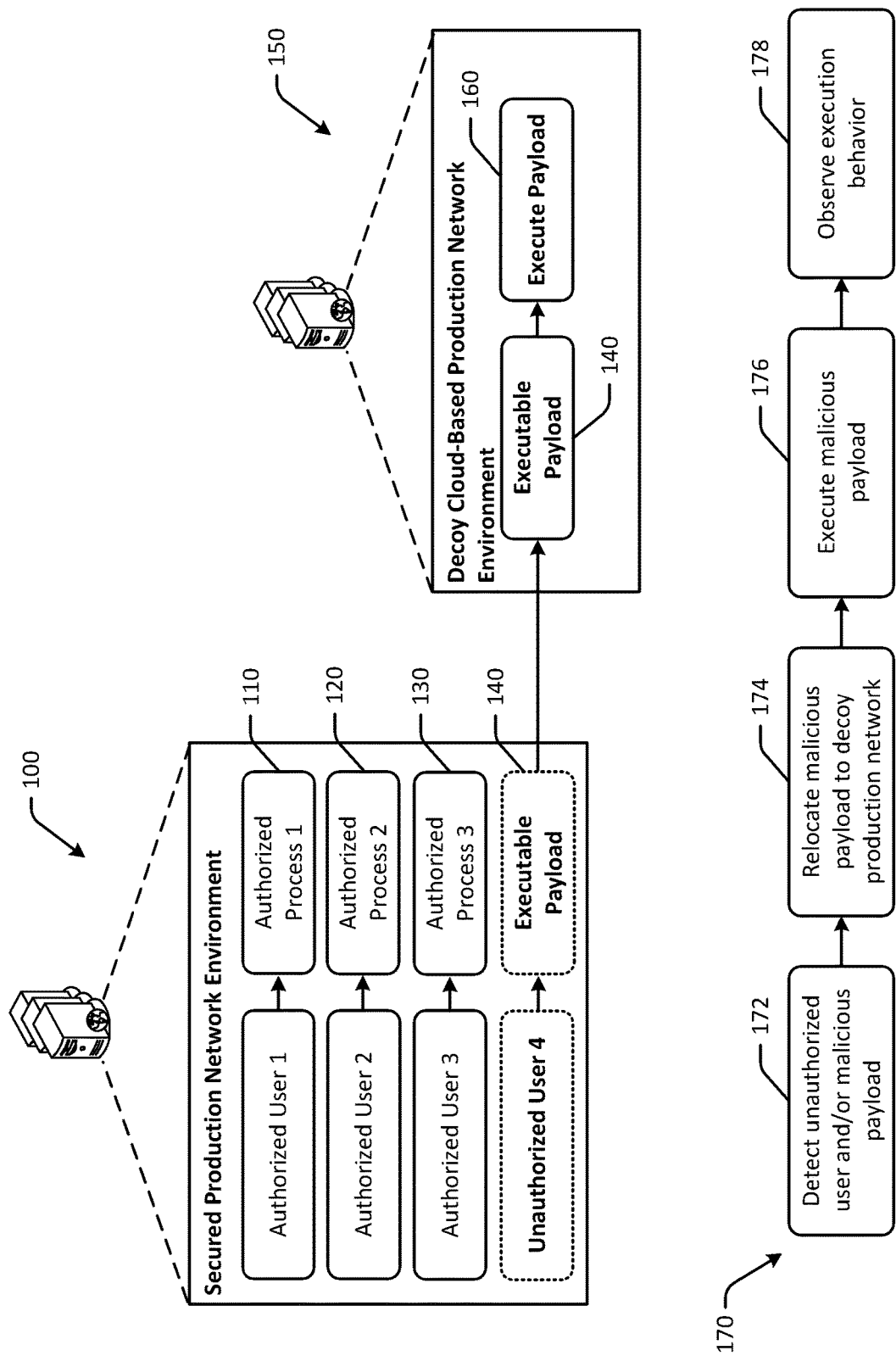
FIG. 1 is a schematic illustration of an example use case for automated deployment of decoy production networks in accordance with one or more example embodiments of the disclosure.

Adversaries may attempt to gain unauthorized access to networks on a regular basis. Some adversaries may attempt to gain unauthorized access to particular networks. For example, adversaries may attempt to access particular banking institution networks, particular medical facility networks, and so forth. Entities may attempt to thwart such attempts using a number of preventative measures. However, adversaries may nonetheless eventually gain unauthorized access. Once such unauthorized access is detected, the adversary may be removed from the network, and updates may be made to prevent subsequent unauthorized access using the same method of access. In many instances, adversaries may continuously target the same entity and/or network. Accordingly, the adversary may then again attempt to gain unauthorized access using another method. During this process, the network owner may be unable to glean information related to the adversary other than a manner of unauthorized access, a type of data breach, etc. Such information alone may be insufficient to effectively identify the adversary and thwart future attacks or attempts for unauthorized access.

Embodiments of the disclosure may allow for not only protection of secured networks from unauthorized access, but may also allow for observation of adversary behavior once the adversary gains access to a secured network. Such behavioral observation may be used to effectively identify the adversary or the type of adversary that gained unauthorized access, and to more effectively prevent future unauthorized intrusions. Moreover, such information may be used to expose the adversary and/or the adversary's preferred type of intrusion method to other entities, thereby rendering the adversary less effective and degrading the adversary's ability to gain unauthorized access to secured networks.

Some embodiments include decoy network environments that may be used to observe adversary behavior after the adversary gains unauthorized access to an actual secured network environment. For example, once the unauthorized user is detected, a decoy network environment may be deployed, and processes and/or executable payloads associated with the unauthorized user may be executed in the decoy network environment. Actions performed and/or processes executed in the decoy network environment may be observed and/or recorded for use by administrators of the secured network. The decoy network environment may be generated using one or more features of the actual network environment, which may therefore lead the adversary to believe the adversary is operating in the actual network environment. In addition, in some embodiments, the adversary may only be moved to the decoy network environment after gaining unauthorized access to the actual network environment, which may therefore increase a likelihood that the adversary believes the decoy network environment is the actual production network. As a result, the adversary may perform actions and/or execute behaviors that are representative of the adversary's goal(s) in accessing the actual network environment. In some instances, the decoy production network may include certain features from the actual production network, or features based on the actual production network, so as to increase a resemblance of the actual production network environment by the decoy production network environment. Such features may include usernames, machine names, IP addresses, email addresses, and/or other features.

This disclosure relates to, among other things, devices, systems, methods, computer-readable media, techniques, and methodologies for automated deployment of decoy production networks. Certain embodiments may generate and/or deploy a number of decoy production network environments. Such network environments may be deployed in cloud environments and may be implemented using one or more virtual machine instances. Various network events, such as power simulation events, quality of service events, and/or other events may be implemented to increase resemblance to the actual network environment, as well as to induce errors or mistakes made by the adversary in the decoy network environment.

Referring to FIG. 1, an example use case for automated deployment of decoy production networks in accordance with one or more example embodiments of the disclosure. In FIG. 1, a secured production network environment 100 may be operating on one or more servers. The secured production network environment 100 may be an actual network environment and may be accessible by authorized users. Unauthorized users may attempt to gain access to the secured production network environment 100 via any number of means, including via phishing attacks, spoofing attacks, social engineering manipulation, and/or other methods. Although the secured production network environment 100 may include one or more defensive features, unauthorized users and/or unauthorized devices may eventually gain access. For example, at a given time interval, the secured production network environment 100 may include have a first authorized user accessing and executing a first authorized process 110 on the secured production network environment 100. Similarly, a second authorized user may be accessing and executing a second authorized process 120 on the secured production network environment 100, a third authorized user may be accessing and executing a third authorized process 130 on the secured production network environment 100, and so forth. Any number of authorized users may be connected to the secured production network environment 100. However, an unauthorized user and/or unauthorized device may be accessing the secured production network environment 100. The unauthorized user may have gained access using credentials associated with an authorized user account, or via another method. As discussed at least with respect to FIG. 2, although the unauthorized user may have gained access to the secured production network environment 100, the unauthorized user may be detected.

An executable payload 140 or other computer process associated with the unauthorized user may be determined. For example, the unauthorized user may attempt to execute a computer program or otherwise open a type of file on the device via which the unauthorized user has gained access. Before the executable payload 140 is executed in the secured production network environment 100, the unauthorized user may be disconnected from the secured production network environment 100, and may instead be connected to a decoy production network environment 150. The executable payload 140 may be transferred to the decoy production network environment 150 and may be executed in the decoy production network environment 150 at operation 160. As the payload is executed, the decoy production network environment 150 may be monitored in real-time. As a result, the actions performed by the adversary can be monitored and recorded, which may provide intelligence related to the goal(s) of the adversary in the secured production network environment 100. Such intelligence may be used to strengthen defenses of the secured production network environment 100.

The decoy production network environment 150 may appear to be the same network as the secured production network environment 100, but may instead be a cloud-based virtual machine instance that replicates some, but not all, features of the secured production network environment 100. The unauthorized user may attempt to discern whether the user is in the secured production network environment 100 or the decoy production network environment 150 using a number of tests or processes, but such tests or processes may be passed by the decoy production network environment 150 as described herein.

To automatically deploy decoy production networks, an example process flow 170 is presented and may be performed, for example, by one or more servers. The server(s) may include at least one memory that stores computer-executable instructions and at least one processor configured to access the at least one memory and execute the computer-executable instructions to perform various actions or operations, such as one or more of the operations in the process flow 170 of FIG. 1.

At block 172, an unauthorized user and/or a malicious payload may be detected. For example, non-native computer code and/or email attachments having malicious payloads may be detected. Any suitable method may be used to detect the unauthorized user and/or malicious payloads.

At block 174, the malicious payload and/or unauthorized user connection may be relocated or rerouted to a decoy production network 150. For example, the server may automatically connect the unauthorized user and/or transfer the malicious payload to the decoy production network 150. In some embodiments, the malicious payload and/or unauthorized user may be manually moved to the decoy production network 150.

At block 176, the malicious payload may be executed in the decoy production network 150. For example, the unauthorized user may be allowed to execute the malicious payload in the decoy production network 150. In another example, malicious payloads may be manually executed in the decoy production network 150 by a network administrator, after which the unauthorized user may gain access to the decoy production network 150.

At block 178, the execution behavior of the malicious payload and/or unauthorized user may be observed, as well as command and control infrastructure and any other features. For example, approved or authorized users associated with the secured production network 100 may observe the behavior of the payload as it executes, as well as subsequent actions that may be performed, so as to glean information related to the identity and goals of the adversary, as well as other features that may be beneficial in securing the actual secured production network 100.

Example embodiments of the disclosure provide a number of technical features or technical effects. For example, in accordance with example embodiments of the disclosure, certain embodiments of the disclosure may automatically generate and deploy decoy production networks, which may be dynamically updated over time to give the appearance of the actual production network. Embodiments of the disclosure may provide security regardless of whether an unauthorized user has accessed an actual production network. As a result of improved functionality, network security may be improved, thereby improving functionality of computer systems. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
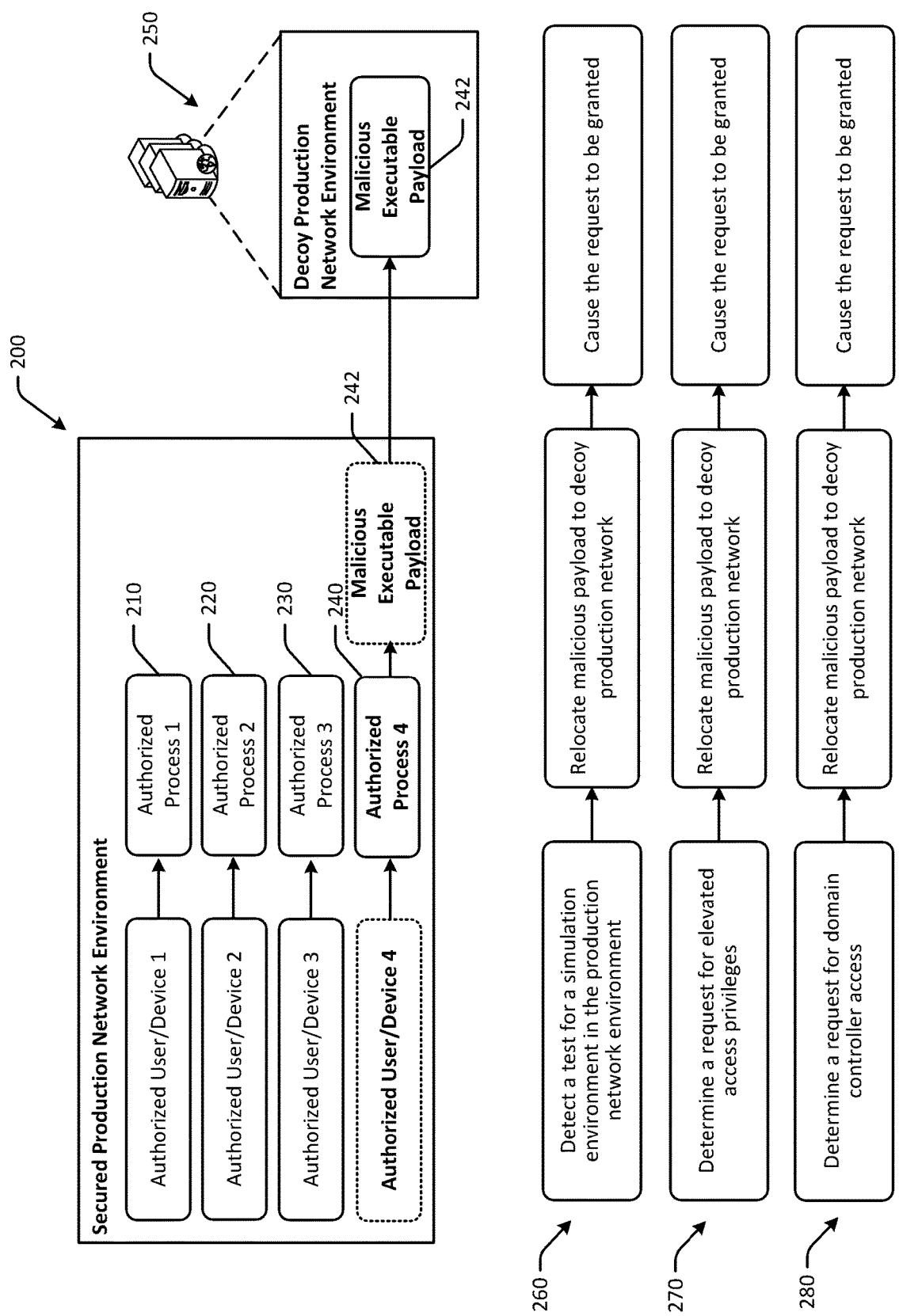
FIG. 2 is a schematic illustration of example unauthorized user detection processes and corresponding automated deployment of a decoy production network in accordance with one or more example embodiments of the disclosure.

FIG. 2 is a schematic illustration of an example unauthorized user detection process and corresponding automated deployment of a decoy production network in accordance with one or more example embodiments of the disclosure. While example embodiments of the disclosure may be described in the context of production network environments, it should be appreciated that the disclosure is more broadly applicable to any type of network environment. Some or all of the blocks of the process flows in this disclosure may be performed in a distributed manner across any number of devices. Some of the data flow or operations may be optional and may be performed in a different order.

In FIG. 2, a secured production network environment 200 is depicted, where one or more users may be connected to the secured production network environment 200. For example, a first user or device may be executing a first authorized process 210, a second user or device may be executing a second authorized process 220, a third user or device may be executing a third authorized process 230, and so forth. A fourth user or device may appear to be an authorized user or device, and may be executing a fourth authorized process 240, such as requesting email or accessing a web browser. However, the fourth authorized process 240 may be associated with a malicious executable payload 242, such as via an email attachment, embedded into an image, and/or other malicious payload. The fourth user may therefore be identified as an unauthorized user or device, instead of the initial assessment of the user being authorized (e.g., if the intruder logged in using genuine credentials, etc.). As a result, a decoy production network 250 may be deployed, and the malicious executable payload 242 may be executed in the decoy production network 250.

Any number of methods may be used to detect the unauthorized user and/or device, as well as the associated malicious payload. In some embodiments, the unauthorized user and/or device, as well as the associated malicious payload, may be detected in the production network environment 200.

For example, a first process flow 260 may be executed to detect unauthorized user and/or device, as well as the associated malicious payload. At a first operation, a test for a simulation environment in the production network environment may be detected. The test for the simulation environment may be used by adversaries to determine whether the adversary is in a sandbox or other decoy environment. Execution of such a test or related tests may be detected. At a second operation, the malicious payload and/or the unauthorized user connection may be relocated to the decoy production network 250. At a third operation, the request associated with the test may be granted. As a result, the adversary may believe the adversary is in the production network environment, where in fact the adversary is executing in the decoy production network environment. Granting the request may cause certain data to be communicated to the adversary, such as real or decoy machine names (where the request was for active machines, etc.), real or decoy IP addresses (where the request was for IP addresses, etc.), and so forth.

In another example, a second process flow 270 may be executed to detect unauthorized user and/or device, as well as the associated malicious payload. At a first operation, a request for elevated access privileges may be received in the production network environment. The request for elevated access privileges may be used by adversaries to gain administrator-level control or permissions, or otherwise elevated access privileges relative to those currently assigned to the compromised user account. Execution of such a request may be detected. At a second operation, the malicious payload and/or the unauthorized user connection may be relocated to the decoy production network 250. At a third operation, the request for elevated access privileges may be granted. As a result, the adversary may believe the adversary is in the production network environment, where in fact the adversary is executing in the decoy production network environment. Granting the request may cause certain data to be communicated to the adversary analogous to that the adversary may access with elevated access privileges in the actual production network environment.

In another example, a third process flow 280 may be executed to detect unauthorized user and/or device, as well as the associated malicious payload. At a first operation, a request for domain controller access may be received in the production network environment. The request for domain controller access may be used by adversaries to gain control or permissions over one or more computer domains, or otherwise increase control relative to control settings currently assigned to the compromised user account. Execution of such a request may be detected. At a second operation, the malicious payload and/or the unauthorized user connection may be relocated to the decoy production network 250. At a third operation, the request for domain controller access may be granted. As a result, the adversary may believe the adversary is in the production network environment, where in fact the adversary is executing in the decoy production network environment. Granting the request may cause certain data to be communicated to the adversary analogous to that the adversary may access with domain controller access in the actual production network environment.

After the request is granted and/or the action is completed in the decoy production network 250, behavior and actions performed by the adversary or unauthorized user may be observed and/or recorded. For example, one or more servers may determine telemetry data associated with actions performed in the decoy production network environment 250. The one or more servers may determine, using the telemetry data, execution behavior characteristics associated with the unauthorized user. In some embodiments, the server may determine, using the telemetry data, command and control characteristics associated with the unauthorized user.

One or more digital artifacts may be generated in the decoy production network environment 250 as a result of unauthorized user actions. Such digital artifacts may be extracted from the decoy production network environment 250 for analysis. In some embodiments, the server may determine a log of digital actions executed in the decoy production network environment 250, where such logs may be presented for consumption to one or more network administrators or other users.

Figure 3:
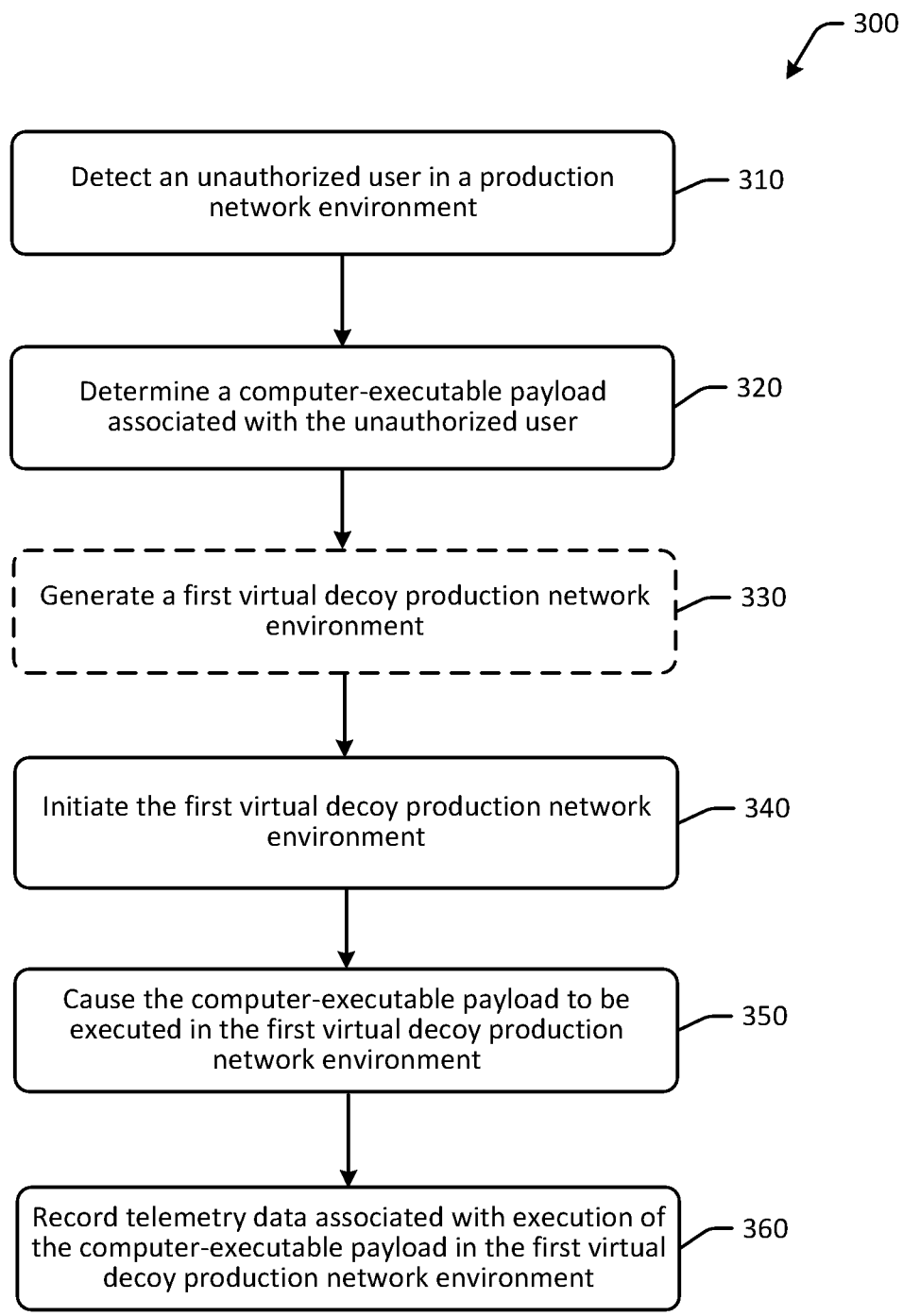
FIG. 3 is a schematic illustration of an example process flow for automated deployment of decoy production networks in accordance with one or more example embodiments of the disclosure.

FIG. 3 depicts an example process flow 300 for automated deployment of decoy production networks in accordance with one or more example embodiments of the disclosure. While example embodiments of the disclosure may be described in the context of production networks, it should be appreciated that the disclosure is more broadly applicable to any type of network. Some or all of the blocks of the process flows in this disclosure may be performed in a distributed manner across any number of devices. Some of the operations of the process flow 300 may be optional and may be performed in a different order.

At block 310 of the process flow 300, computer-executable instructions stored on a memory of a device, such as a server, may be executed to detect an unauthorized user in a production network environment. For example, the server may be configured to execute one or more modules to determine that an unauthorized user has gained access to the production network. In some embodiments, the unauthorized user may be detected based at least in part on attempts to execute certain commands or computer-executable instructions, based on requests made by the user account that has been compromised (e.g., request to elevate permissions, etc.), and so forth. In some embodiments, the unauthorized user may be detected automatically, whereas in other embodiments, the unauthorized user may be detected manually and/or using a combination of automated tools and manual input. In some embodiments, the server(s) may be configured to detect an attempt to access the production network by an unauthorized user, where such detection may be used to redirect the unauthorized user to the decoy production network. In such instances, the unauthorized user may not gain access to the actual production network.

At block 320 of the process flow 300, computer-executable instructions stored on a memory of a device, such as the server, may be executed to determine a payload associated with the unauthorized user. Payloads may be computer-executable in some instances, whereas in other instances payloads may be scripts, certain file types (e.g., pdf file types, image file types, etc.), and the like. For example, the server may be configured to determine a computer-executable payload associated with the unauthorized user. The computer-executable payload may be a computer program or file that the unauthorized user attempts to execute, or may be attached or otherwise delivered by the unauthorized user to the production network.

At optional block 330 of the process flow 300, computer-executable instructions stored on a memory of a device, such as the server, may be executed to generate a first virtual decoy production network environment. For example, the server may execute one or more modules to generate a first virtual decoy production network environment. The first virtual decoy production network environment may be the decoy production networks discussed herein. The decoy production network may be based at least in part on features that are the same as those of the actual production network. For example, features such as user account identifiers, machine identifiers, active directories, and so forth may be based on actual data, or may be actual data. As a result, the unauthorized user may be unable to determine that their executions are occurring in the decoy production network.

At block 340, computer-executable instructions stored on a memory of a device, such as the server, may be executed to initiate the first virtual decoy production network environment. For example, the decoy production network may be deployed in a virtual machine instance. Any number of decoy production networks may be generated and/or deployed at the same time. The different decoy production networks may have the same data or may vary depending on whether randomization of values is used to create dummy data for the specific instance.

At block 350, computer-executable instructions stored on a memory of a device, such as the server, may be executed to cause the computer-executable payload to be executed in the first virtual decoy production network environment. For example, the computer-executable payload may be relocated to the decoy production network, and may be executed in the decoy production network instead of the actual production network.

At block 360, computer-executable instructions stored on a memory of a device, such as the server, may be executed to record telemetry data associated with execution of the computer-executable payload in the first virtual decoy production network environment. For example, the actions and/or processes run in the decoy production network may be logged, as well as artifacts and/or telemetry data captured during operations performed by the unauthorized user in the decoy production environment.

As a result, the behavior of the unauthorized user, as well as associated command and control infrastructure, may be observed while the unauthorized user is unaware of the monitoring. Intelligence gathered during the observation process may be used to identify the unauthorized user, their preferred methods of operation, and other information that can be used to effectively thwart future attempts by the unauthorized user and/or others to gain unauthorized access to the production network.

Figure 4:
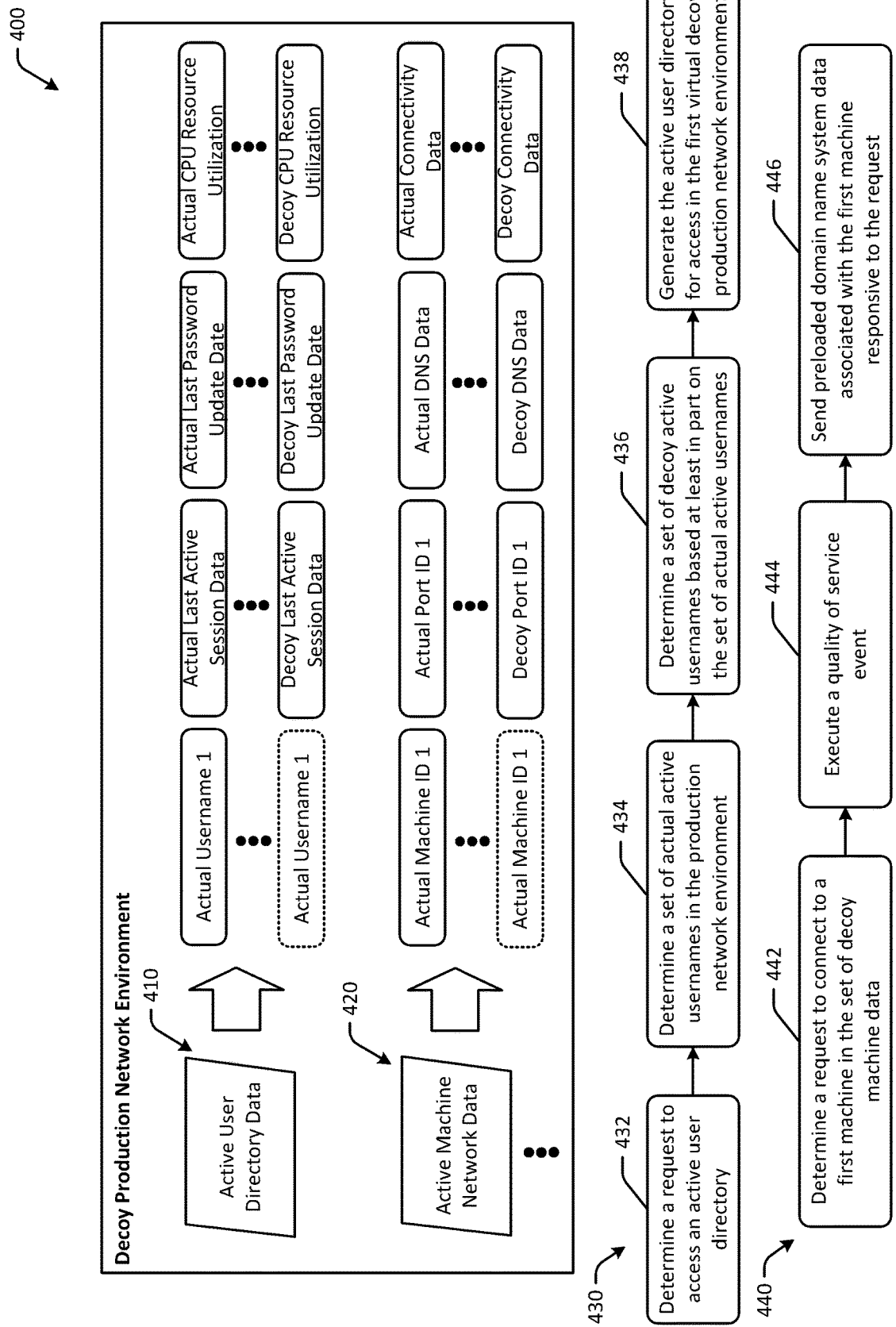
FIG. 4 is a schematic illustration of an example decoy production network with sample network features in accordance with one or more example embodiments of the disclosure.

FIG. 4 is a schematic illustration of an example decoy production network 400 with sample network features in accordance with one or more example embodiments of the disclosure. While example embodiments of the disclosure may be described in the context of production network environments, it should be appreciated that the disclosure is more broadly applicable to any type of network environment. Some or all of the blocks of the process flows in this disclosure may be performed in a distributed manner across any number of devices. Some of the data flow or operations may be optional and may be performed in a different order.

In FIG. 4, various features of the decoy production network 400 are depicted. Some embodiments of the decoy production network 400 may include pre-generated data, whereas other embodiments may generate data on an on-demand basis, such as responsive to requests or actions performed by an unauthorized user. For example, the decoy production network 400 may include active user directory data 410. The active user directory data 410 may include some authentic features and some decoy features. In one example, the active user directory data 410 may include actual usernames in the active user directory data 410 for the decoy production network 400. In another example, the active user directory data 410 may include generated decoy data, such as randomly generated last active session data for a particular user account, randomly generated last password update date for a particular user account, decoy CPU resource utilization for a particular user account, and so forth. As a result, the unauthorized user may view the active user directory data 410 and may be unable to tell that the active user directory data 410 has decoy data, and/or that the unauthorized user is connected to the decoy production network 400.

Another example of features that may be included in the decoy production network 400 is active machine network data 420. The active machine network data 420 may similarly include some authentic information and some decoy information. For example, the active machine network data 420 may include actual machine identifiers, but may include decoy port identifiers, decoy DNS data, decoy connectivity data, and so forth. In some embodiments, a connection to a machine in the active machine network data 420 may be simulated by providing "ping" response data that is preloaded in the decoy production network 400. In addition, quality of service events can be introduced if the unauthorized user attempts to connect to other machines in the active machine network data 420, so as to dissuade the unauthorized user from continuing to investigate the active machine network data 420. Other types of features based on the actual production network may be included in the decoy production network 400.

One or more process flows may be executed to generate features of the decoy production network 400. For example, a process flow 430 may be executed to generate the active user directory data 410. At block 432, a request to access an active user directory may be determined. For example, an unauthorized user may request to access an active user directory in the decoy production network. At block 434, the server may determine a set of actual active usernames in the production network environment. At block 436, the server may determine a set of decoy active usernames based at least in part on the set of actual active usernames. In some embodiments, the decoy active usernames may be the same as the actual active usernames, whereas in other embodiments, the decoy active usernames may be variations of the actual active usernames. At block 438, the server may generate the active user directory for access in the decoy production network 400, where the active user directory comprises the set of decoy active usernames.

A process flow 440 may be executed by the server to generate the active machine network data 420. For example, the server may determine a request to access machine data in the decoy production network environment, and may determine a set of actual machine data in the production network environment. The server may determine a set of decoy machine data based at least in part on the set of actual machine data, and may generate the machine data for access in the first virtual decoy production network environment, where the machine data comprises the set of decoy machine data.

At block 442, the server may determine a request to connect to a first machine in the set of decoy machine data. For example, the unauthorized user may be attempting to confirm access and/or authenticity of the decoy production network. At block 444, the server may execute a quality of service event, and at block 446, the server may send preloaded domain name system data associated with the first machine responsive to the request. In this manner, the unauthorized user may not suspect they are operating in the decoy production network 400.

Figure 5:
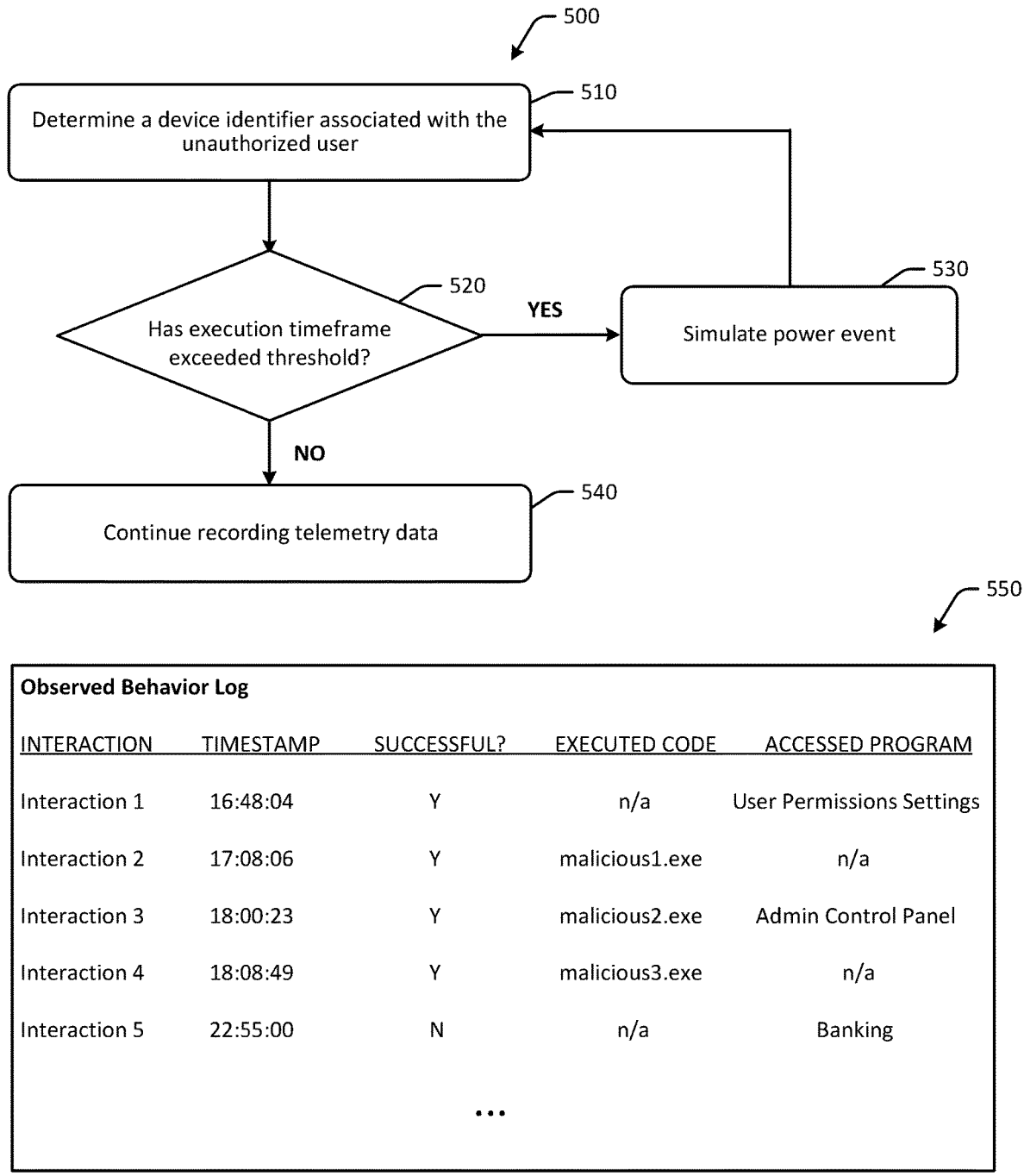
FIG. 5 is a schematic illustration of an example process flow for implementing sample decoy production network features in accordance with one or more example embodiments of the disclosure.

FIG. 5 depicts an example process flow 500 for implementing sample decoy production network features in accordance with one or more example embodiments of the disclosure. While example embodiments of the disclosure may be described in the context of production network environments, it should be appreciated that the disclosure is more broadly applicable to any type of network environment. Some or all of the blocks of the process flows in this disclosure may be performed in a distributed manner across any number of devices. Some of the data flow or operations may be optional and may be performed in a different order.

In FIG. 5, at block 510 of process flow 500, computer-executable instructions stored on a memory of a device, such as a server, may be executed to determine a device identifier associated with an unauthorized user. For example, the device identifier may be determined for a device that accessed an actual production network and was subsequently moved to a decoy production network.

At determination block 520, a determination may be made as to whether the execution time in the decoy production network has met or exceeded a threshold length of time. For example, the threshold may be eight hours or another random time that corresponds to a maximum length of time the unauthorized user may access the decoy production network. Such time limits may resemble a user powering off their laptop or other cyclical events that occur in the actual production network. If it is determined at determination block 520 that the execution timeframe has exceeded the threshold, at block 530 a power event may be simulated. Simulation of a power event may trigger disconnection of the unauthorized user and/or device from the decoy production network until a later time. The process flow 500 may then return to block 510.

If it is determined at determination block 520 that the execution timeframe has not exceeded the threshold, at block 540 telemetry data may continue being recorded as the unauthorized user and/or device remains connected to the decoy network. The process flow 500 may then return to block 510 for periodic determinations. As a result of interrupted access, the unauthorized user may rush to perform tasks when the connection to the decoy production network is online, and may therefore make mistakes that increase value of intelligence collected.

An example observed behavior log 550 is depicted in FIG. 5, which may include a log of interactions and corresponding timestamps, as well as whether the action was successfully completed in the decoy production network along with stored snippets of computer-executable code where applicable. Network-based information, host-based information, and other types of data may be observed and/or recorded. For example, IP traffic, TCP/UDP data, communications from or to a particular device (e.g., communications within and/or external to a network, etc.), and so forth may be observed and/or recorded. Other information, such as programs accessed and the like, may also be logged. Command and control infrastructure data may be observed and/or recorded. User interfaces of accessed programs may be generated to appear as authentic user interfaces, which may induce the unauthorized user to provide critical information, such as banking information and the like.

Figure 6:
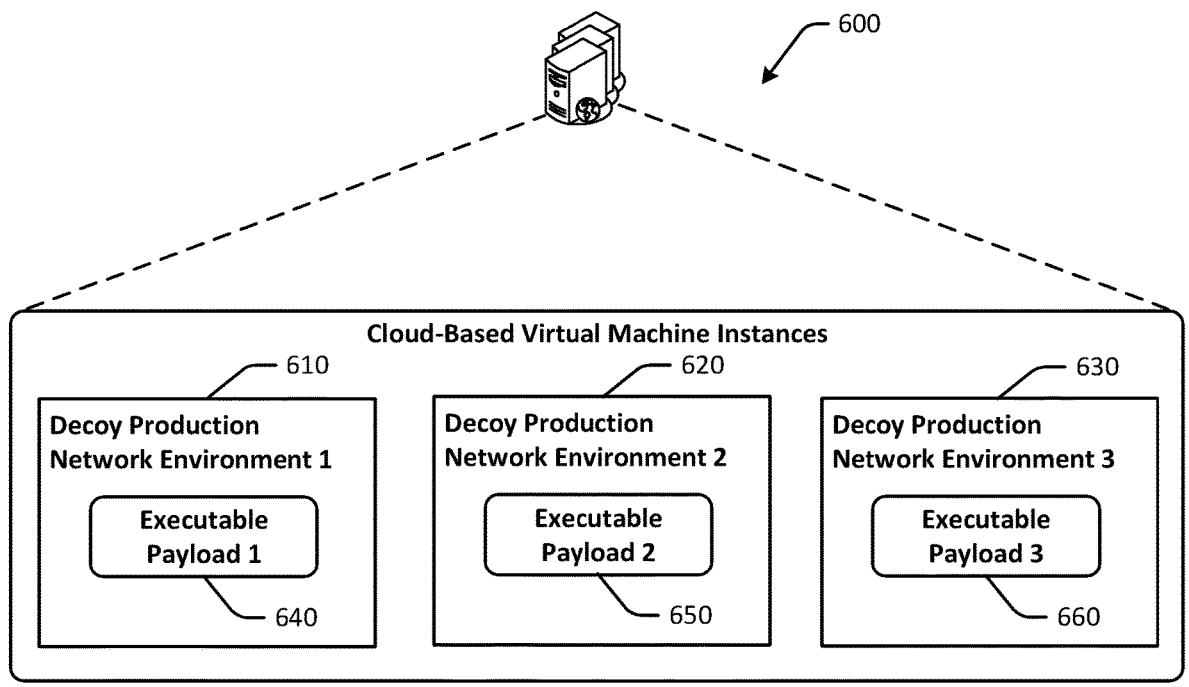
FIG. 6 is a schematic illustration of an example computing environment with multiple decoy product networks in accordance with one or more example embodiments of the disclosure.

FIG. 6 is a schematic illustration of an example computing environment 600 with multiple decoy product networks in accordance with one or more example embodiments of the disclosure. While example embodiments of the disclosure may be described in the context of production network environments, it should be appreciated that the disclosure is more broadly applicable to any type of network environment. Some or all of the blocks of the process flows in this disclosure may be performed in a distributed manner across any number of devices. Some of the data flow or operations may be optional and may be performed in a different order.

Decoy production networks may be deployed and maintained via updates for any length of time, or until the unauthorized user stops taking action in the decoy environment. Any number of decoy production networks may be deployed simultaneously for individual adversaries. For example, a first decoy production network 610 may be deployed for a first adversary with a first executable payload 640, a second decoy production network 620 may be deployed for a second adversary with a second executable payload 650, a third decoy production network 630 may be deployed for a third adversary with a third executable payload 660, and so forth. The decoy production networks may be observed and/or monitored simultaneously.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
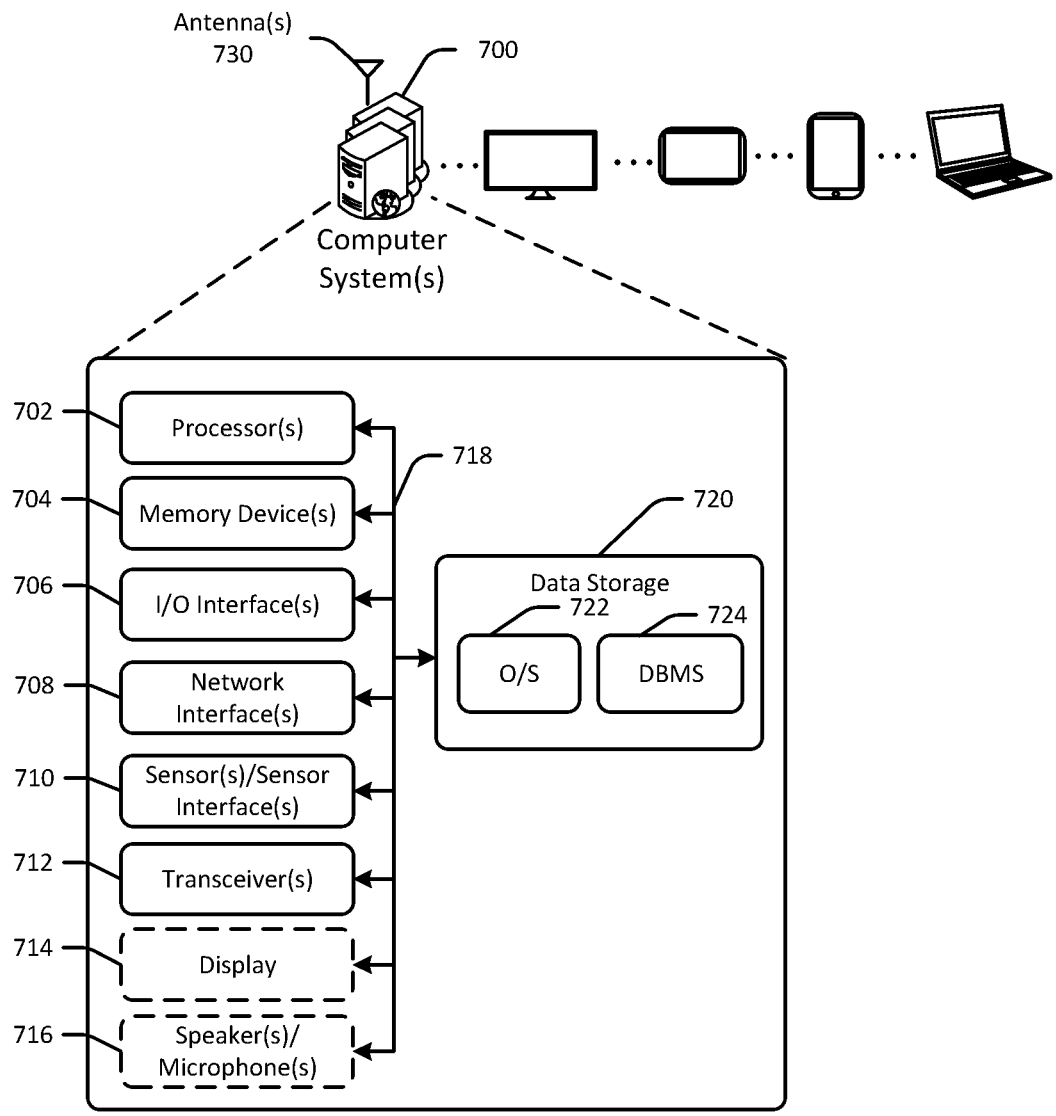
FIG. 7 is a schematic block diagram of an illustrative device in accordance with one or more example embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for a computer system used in conjunction with any one of the system(s) of FIGS. 1-6.

The computer system(s) 700 may be configured to communicate with one or more servers, user devices, or the like. The computer system(s) 700 may be configured to cause the controller and/or computer system(s) to execute, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    detecting, by one or more computer processors coupled to memory, an unauthorized user in a production network environment;
    determining a payload associated with the unauthorized user;
    initiating a first virtual decoy production network environment;
    causing the payload to be executed in the first virtual decoy production network environment;
    recording telemetry data associated with execution of the payload in the first virtual decoy production network environment;
    determining a request to access an active user directory in the first virtual decoy production network environment;
    determining a set of actual active usernames in the production network environment;
    determining a set of decoy active usernames based at least in part on the set of actual active usernames, wherein the set of decoy active usernames is the set of actual active usernames; and
    generating the active user directory for access in the first virtual decoy production network environment, wherein the active user directory comprises the set of decoy active usernames.

2. The method of claim 1, further comprising:
    determining a device identifier associated with the unauthorized user; and
    simulating a power event for the device identifier, wherein the unauthorized user is disconnected from the first virtual decoy production network environment during the power event.

3. The method of claim 1, further comprising:
    determining a request for elevated access privileges in the first virtual decoy production network environment; and
    causing the request to be granted.

4. The method of claim 1, further comprising:
    determining a request for domain controller access in the first virtual decoy production network environment; and
    causing the request to be granted.

5. The method of claim 1, wherein detecting the unauthorized user in the production network environment comprises detecting a test for a simulation environment in the production network environment.

6. The method of claim 5, further comprising:
    determining a first request to access machine data in the first virtual decoy production network environment;
    determining a set of actual machine data in the production network environment;
    determining a set of decoy machine data based at least in part on the set of actual machine data; and
    generating the machine data for access in the first virtual decoy production network environment, wherein the machine data comprises the set of decoy machine data.

7. The method of claim 6, further comprising:
    determining a second request to connect to a first machine in the set of decoy machine data;
    executing a quality of service event; and
    sending preloaded domain name system data associated with the first machine responsive to the second request.

8. The method of claim 1, further comprising:
    determining, using the telemetry data, execution behavior characteristics associated with the unauthorized user.

9. The method of claim 1, further comprising:
    determining, using the telemetry data, command and control characteristics associated with the unauthorized user.

10. The method of claim 1, further comprising:
    extracting a set of digital artifacts from the first virtual decoy production network environment.

11. The method of claim 1, further comprising:
    determining a log of digital actions executed in the first virtual decoy production network environment.

12. A system comprising:
    memory that stores computer-executable instructions; and
    at least one processor configured to access the memory and execute the computer-executable instructions to:
        detect an attempt by an unauthorized user to access a production network environment;
        determine a payload associated with the unauthorized user;
        initiate a first virtual decoy production network environment;
        cause the payload to be executed in the first virtual decoy production network environment;
        record telemetry data associated with execution of the payload in the first virtual decoy production network environment;
        determine a device identifier associated with the unauthorized user; and simulate a power event for the device identifier, wherein the unauthorized user is disconnected from the first virtual decoy production network environment during the power event.

13. The system of claim 12, wherein the at least one processor is further configured to access the memory and execute the computer-executable instructions to:

determine a request to access an active user directory in the first virtual decoy production network environment;

determine a set of actual active usernames in the production network environment;

determine a set of decoy active usernames based at least in part on the set of actual active usernames; and generate the active user directory for access in the first virtual decoy production network environment, wherein the active user directory comprises the set of decoy active usernames.

14. The system of claim 12, wherein the at least one processor is further configured to access the memory and execute the computer-executable instructions to:

determine a request for elevated access privileges in the first virtual decoy production network environment; and cause the request to be granted.

15. The system of claim 12, wherein the at least one processor is further configured to access the memory and execute the computer-executable instructions to:

determine a request for domain controller access in the first virtual decoy production network environment; and cause the request to be granted.

16. The system of claim 12, wherein the at least one processor is further configured to access the memory and execute the computer-executable instructions to:

determine a first request to access machine data in the first virtual decoy production network environment;

determine a set of actual machine data in the production network environment;

determine a set of decoy machine data based at least in part on the set of actual machine data; and generate the machine data for access in the first virtual decoy production network environment, wherein the machine data comprises the set of decoy machine data.

17. A method comprising:

detecting, by one or more computer processors coupled to memory, an unauthorized user in a production network environment;

determining a payload associated with the unauthorized user;

initiating a first virtual decoy production network environment;

causing the payload to be executed in the first virtual decoy production network environment;

recording telemetry data associated with execution of the payload in the first virtual decoy production network environment;

determining a first request to access machine data in the first virtual decoy production network environment;

determining a set of actual machine data in the production network environment;

determining a set of decoy machine data based at least in part on the set of actual machine data;

generating the machine data for access in the first virtual decoy production network environment, wherein the machine data comprises the set of decoy machine data;

determining a second request to connect to a first machine in the set of decoy machine data;

executing a quality of service event; and sending preloaded domain name system data associated with the first machine responsive to the second request.

18. The method of claim 17, further comprising:

determining, using the telemetry data, execution behavior characteristics associated with the unauthorized user.

19. The method of claim 17, further comprising:

determining, using the telemetry data, command and control characteristics associated with the unauthorized user.

20. The method of claim 17, further comprising:

extracting a set of digital artifacts from the first virtual decoy production network environment.

* * * * *